(12) United States Patent
Salokannel et al.

(10) Patent No.: US 8,005,465 B2
(45) Date of Patent: Aug. 23, 2011

(54) CONNECTIONLESS INFORMATION TRANSFER FROM ADVERTISING DEVICE

(75) Inventors: Juha Salokannel, Tampere (FI); Päivi M. Ruuska, Tampere (FI); Jukka Reunamäki, Tampere (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 11/557,821

(22) Filed: Nov. 8, 2006

(65) Prior Publication Data

US 2008/0109302 A1    May 8, 2008

(51) Int. Cl.
*G06Q 30/00* (2006.01)
(52) U.S. Cl. ............... 455/414.1; 455/414.2; 455/414.3; 455/414.4; 455/450
(58) Field of Classification Search ............... 455/414.1, 455/414.2, 414.3, 141.4, 450; 705/14
See application file for complete search history.

(56) References Cited

U.S. PATENT DOCUMENTS

| | | | |
|---|---|---|---|
| 2002/0022961 A1* | 2/2002 | Sepanaho | 705/1 |
| 2002/0065045 A1* | 5/2002 | Kim | 455/41 |
| 2002/0164977 A1* | 11/2002 | Link, II et al. | 455/414 |
| 2003/0130909 A1* | 7/2003 | Caci et al. | 705/27 |
| 2003/0215780 A1* | 11/2003 | Saar et al. | 434/351 |
| 2004/0204078 A1* | 10/2004 | Fare et al. | 455/557 |
| 2007/0282678 A1* | 12/2007 | Dendi et al. | 705/14 |

FOREIGN PATENT DOCUMENTS

| | | |
|---|---|---|
| EP | 1494407 A1 | 1/2005 |
| EP | 1499078 A1 | 1/2005 |
| WO | 0225873 A2 | 3/2002 |
| WO | 2007050997 A2 | 5/2007 |

* cited by examiner

*Primary Examiner* — Charles Appiah
*Assistant Examiner* — William F Rideout
(74) *Attorney, Agent, or Firm* — Locke Lord Bissell & Liddell

(57) ABSTRACT

A system for conveying wireless information between an advertising device (advertiser) and another wireless communication device (receiving device). The advertiser's broadcast signal (advertisement) may inform the receiving device that information is available from the advertiser without the requirement of establishing a formal network connection. This information may be then be conveyed, by request, to the receiving device. Further, the advertising device may, in some instances, continue to broadcast to other receiving devices even though it is already engaged in a formal network connection with a receiving device.

15 Claims, 14 Drawing Sheets

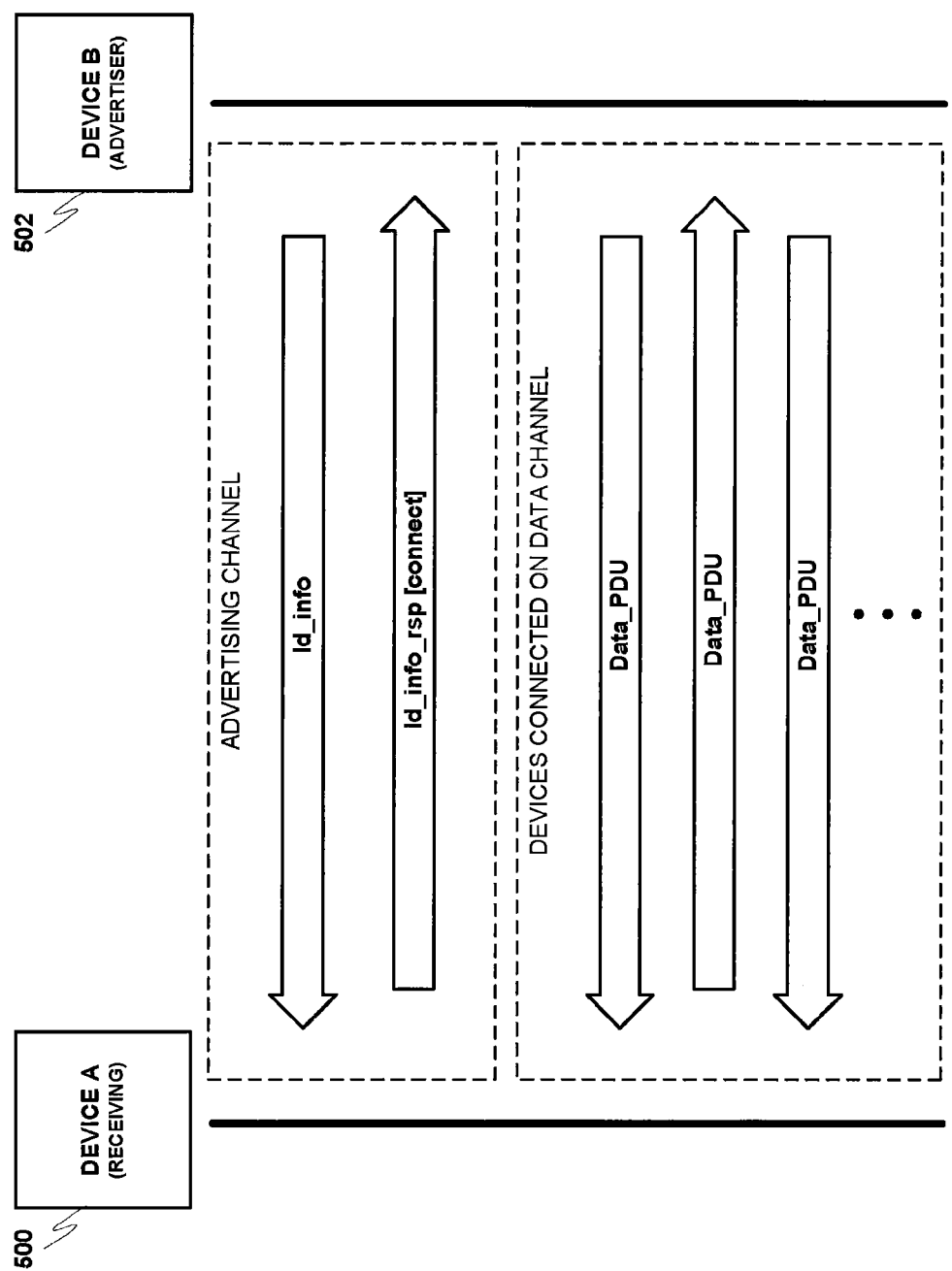

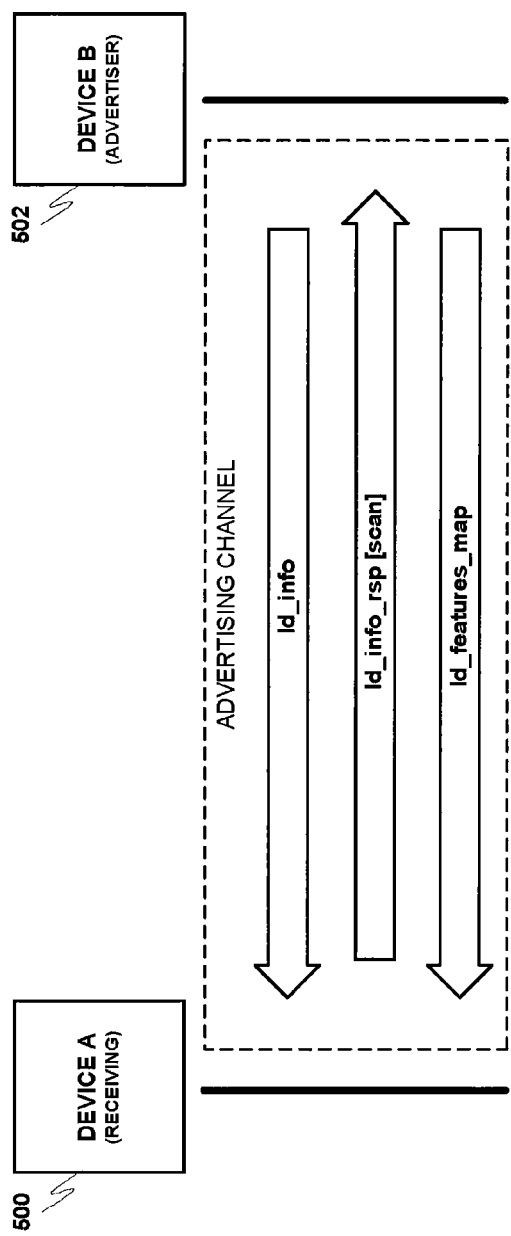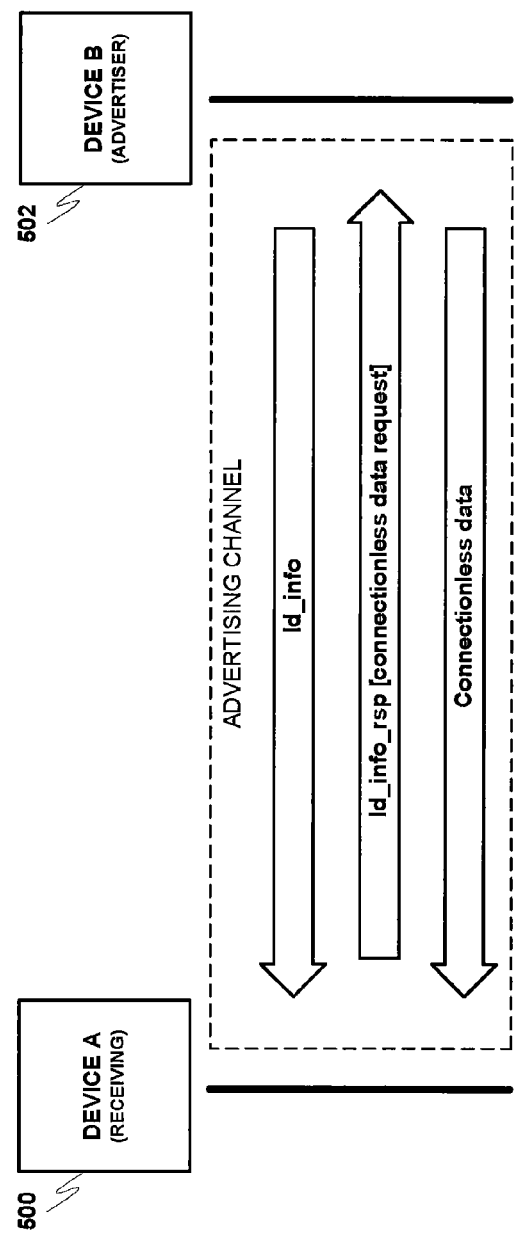

Id_info:

| Preamble (8 bit) | Sync word (13 bit) | Address (40 bit) | Device service (8 bit) | CRC (16 bit) |

600

| Purpose | Details |
|---|---|
| Allow role switch (1bit) | Allow role switch indicates whether the advertiser may operate as Polled device, if requested in ID_INFO_RSP.<br>0 = false<br>1 = true |
| Private address (1bit) | Private address indicates whether the ID PDU's Address field and the LL PDUs' Sync word from the device contain 40-bit public or private address.<br>0 = Public address<br>1 = Private address |
| Security supported (1bit) | Security supported indicates whether the device supports secure links.<br>0 = false<br>1 = true |
| Limited access (1bit) | Limited access indicates whether the device accepts ID_INFO_RSP packets only from devices with certain device address.<br>0 = false<br>1 = true |
| Connection possible (1) | Connection possible indicates whether the device transmitting the ID_INFO is currently capable to enter connection. If a peripheral device has already one connection and it may not serve another and shall indicate it with this bit. (In addition, this may indicate that the device is not capable of transmitting Feature map)<br>0 = false<br>1 = true |
| Connectionless data available (1) | Connectionless data available indicates whether the device may transmit connectionless data if it is requested in ID_INFO_RSP<br>0 = false<br>1 = true |
| Future use (2bits) | Set to all-zero |

Id_info_rsp: | Preamble (8 bit) | Sync word (42 bit) | Header (16 bit) | HEC (8 bit) | Payload (56 bit) | CRC (16 bit) |

604

606

| Field name | Purpose |
|---|---|
| DRS (1bit) | DRS (Do Role Switch) indicates whether the initiator requests Poller role in data channel 0 = No (set 0, if the role switch is not allowed in ID_INFO) 1 = Yes |
| ScanOrConnectOrConnectionlessDataReq (2bit) | ScanOrConnectOrConnectionlessDataReq indicates whether the packet was transmitted to ask for further information about the Advertiser (Scan), to setup a connection with it (Connect), or to request Connectionless Data (Connectionless Data Req). 0 = Scan 1 = Connect 2 = Connectionless Data Req. |
| PrivateAddress (1bit) | Private address indicates whether the Address field contains 40-bit public or private address. 0 = Public address 1 = Private address |
| Data channel (1bit) | The frequency channel for data transfer. Valid only if ScanOrConnectOrConnectionlessDataReq=1. |
| Future use (7bits) | Set to all-zero |
| Address (40bits) | Public or private address as indicated in PrivateAddress. |

FIG. 6C

Id_info_rsp:

| Preamble (8 bit) | Sync word (42 bit) | Header (16 bit) | HEC (8 bit) | Payload (48 bit) | CRC (16 bit) |

608

610

| Field name | Purpose |
|---|---|
| DRS (1bit) | DRS (Do Role Switch) indicates whether the initiator requests Poller role in data channel<br>0 = No (set 0, if the role switch is not allowed in ID_INFO)<br>1 = Yes |
| ScanOrConnect (1bit) | ScanOrConnect indicates whether the packet was transmitted to ask for further information about the Advertiser (Scan) or to setup a connection with it (Connect).<br>0 = Scan<br>1 = Connect |
| PrivateAddress (1bit) | Private address indicates whether the Address field contains 40-bit public or private address.<br>0 = Public address<br>1 = Private address |
| Data channel (1bit) | The frequency channel for data transfer. Valid only if ScanOrConnect=1. |
| Requested information (8bits) | Requested information may indicate ConnectionlessData request, e.g. a value may be defined for that. Different values may be defined for different kind of connectionless data. (This information is valid e.g. only if ScanOrConnect = 0) |
| Address (40bits) | Public or private address as indicated in PrivateAddress. |

FIG. 6D

Id_features_map:

| Preamble (8 bit) | Sync word (42 bit) | Header (16 bit) | HEC (8 bit) | Payload (48 bit) | CRC (16 bit) |
|---|---|---|---|---|---|

612

| Parameter (length in bits) | Note |
|---|---|
| ProtocolVersion (8) | Version of the used protocol |
| RestOfAddress (24) | Part of 64-bit device address |
| SupportedProfiles (16) | A bitmap of supported profiles. |
| AddressPresent (1) | 0=false  1=true |
| DeviceNameSecured (1) | 0=false  1=true |
| FU (1) | For future use. Set to zero. |
| DeviceNameLength (5) | The number of bytes used for DeviceName field. |
| DeviceName (1x8 - 24x8) | User or application given name, coding in UTF-8 format. The maximum length is 24 characters. |

614

CONNECTIONLESS INFORMATION TRANSFER FROM ADVERTISING DEVICE

BACKGROUND OF INVENTION

The present invention relates to establishing wireless communication between an advertising device and another wireless device desiring to consume the advertised information, and more specifically, to a system for conveying wireless advertised information from one wireless communication device to another without the need to establish a formal connection.

DESCRIPTION OF PRIOR ART

More and more, the ability to communicate wirelessly is emerging as a popular feature to include in many devices where communication was previously not contemplated. This popularity may, at least in part, be fueled by rapid technological development in the area of multifunction wireless communication devices (WCD). Consumers may now replace common standalone productivity devices like computers, laptops, facsimile machines, personal digital assistants, etc. with a single device capable of performing all of these functions. Devices with these abilities have been embraced by business people who often find that work can now be completed during time that was previously wasted (commutes to and from work, home, etc.)

However, while a WCD may be empowered with many beneficial features, the small size and power constraints of these devices may also create a hindrance for the user. The operator interfaces installed in these devices are often small, and not conducive to high throughput. As a result, users must rely on peripheral input devices such as keyboards, mice, headsets, etc. in order to perform their work. Further, the small size of many devices today also implies that there is a lack of physical connections to connect wired devices. Therefore, a WCD must not only be able to support wireless communications with a peripheral device, it must also be able to support connections with multiple peripheral devices being operated concurrently.

As more and more common devices evolve to include electronic control, it may also become beneficial to couple these devices to a WCD or possibly other "intelligent" mechanisms. For example, it may be desirable to wirelessly link two or more low power devices in a coordinated relationship, such as linking a wristwatch including health-monitoring intelligence to various wireless sensors placed on a user's body. Simpler communication protocols with lower power requirements are now being developed so that even devices that have not historically been "computerized" may now provide wireless information to, and in some cases receive information from, a WCD. These devices must often run on battery power, and as a result, must rely on simple, power efficient communications in order to be practical. Most of the existing wireless communication protocols are either too simple or too complex to make these newly computerized applications workable. For example, radio frequency (RF) communication is efficient and may be powered by a scanning device, however, currently available RF transponder chips are space-limited and usually only provide information. On the other hand, IEEE 802.11x WLAN or "WiFi" is a commonly available and widely accepted wireless solution. However, the power requirements for WLAN may not make it appropriate for small device installations. Bluetooth™ is another short-range wireless protocol that is often used for linking peripheral devices to a WCD. The Bluetooth™ standard was originally designed to replace wires with a wireless medium for simple peripheral input devices. While, Bluetooth™ has now evolved much further than linking headsets and mice, it still may not be the best solution for extremely resource constrained wireless devices, as will be explored further below.

In addition to the general benefits discussed above, the establishment of simple, low power devices able to communicate wirelessly could be useful in many applications. For example, devices previously unknown to a WCD user that "advertise" their presence can be used to convey information. In this way, information consumers may obtain useful data that they may have not known was available. For example, a low power wireless device may be employed communicating via Wibree™ in order to distribute sales or event information to people in a shopping mall. People strolling within transmission range of the device may be informed of the availability of useful information that may be obtained manually or automatically by a WCD. Further to this exemplary scenario, a variety of battery-powered stand-alone sensors, such as motion sensors, temperature sensors, audio and visual sensors, etc., may also be employed to monitor environmental conditions in the shopping mall. These sensors may communicate using a short-range wireless medium like Wibree™ in order to wirelessly transmit the monitored information to people wandering around the shopping mall.

However, in a situation as described above, it is foreseeable that a low power and/or complexity advertising device could become overwhelmed. This may occur, for example, if the advertising device must establish a formal network connection with every wireless device that seeks to obtain the wireless information. The amount of time required to negotiate a connection, complete the establishment of the connection, determine what information is available for transfer and then finally transfer the information may be prohibitive. As a result, only a minority of the total population of potential devices may be serviced in this manner.

As a result, what is needed is a method and system for conveying wireless information from an advertising device to a receiving device without the need of establishing a formalized network connection. The receiving device should be able to identify the advertising device and determine immediately, or with little additional communication, what information is offered be the advertising device. Further, basic information should be able to be conveyed without a network connection, and a connected advertising device should be able to continue to convey this basic information despite already being formally connected to a receiving device.

SUMMARY OF INVENTION

The present invention includes at least a method, device, computer program and system for conveying wireless information between an advertising device (advertiser) and another communication device (receiving device). The broadcast signal of the advertiser may inform a receiving device that information is available from the advertiser without the requirement of establishing a formal network connection. This connectionless information may be then be transmitted, by request, to the receiving device.

The advertiser may broadcast a message including at least the identity of the advertiser via short-range wireless communication. In at least one embodiment of the present invention, other devices receiving this broadcast signal may respond by inquiring as to whether a feature map is available from the advertiser. If available, the advertiser may respond by providing the feature map information to the receiving device. In another example of the invention, the message broadcast by the advertising device may further indicate information that may be provided by the advertiser without a formal wireless network connection. This information may be requested by a receiving device in a response to the broadcast message.

The advertiser may sometimes be required to engage in a formal network connection with a receiving device. In some instances, the advertiser may continue to broadcast information while engaged in the formal network connection. The advertiser may change information in the broadcast message to indicate to other receiving devices that the advertiser is actively engaged in a formal network connection, but may still provide some information during times when not actively engaged in communication with the networked device.

DESCRIPTION OF DRAWINGS

The invention will be further understood from the following detailed description of a preferred embodiment, taken in conjunction with appended drawings, in which:

FIG. 5A discloses an example of communications between an advertiser and a receiving device in accordance with at least one embodiment of the present invention.

FIG. 5B discloses an example of communications between an advertiser and a receiving device including additional information transmitted without the need for a formal network connection in accordance with at least one embodiment of the present invention.

FIG. 5C discloses another example of communications between an advertiser and a receiving device including additional information transmitted without the need for a formal network connection in accordance with at least one embodiment of the present invention.

FIG. 6A discloses an exemplary structure for an ID_INFO packet in accordance with at least one embodiment of the present invention.

FIG. 6B discloses an exemplary structure for an ID_INFO_RSP packet in accordance with at least one embodiment of the present invention.

FIG. 6C discloses another exemplary structure for an ID_INFO_RSP packet in accordance with at least one embodiment of the present invention.

FIG. 6D discloses an exemplary structure for an ID_FEATURES_MAP packet in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Device

As previously described, the present invention may be implemented using a variety of wireless communication equipment. Therefore, it is important to understand the communication tools available to a user before exploring the present invention. For example, in the case of a cellular telephone or other handheld wireless devices, the integrated data handling capabilities of the device play an important role in facilitating transactions between the transmitting and receiving devices.

Figure 1A:
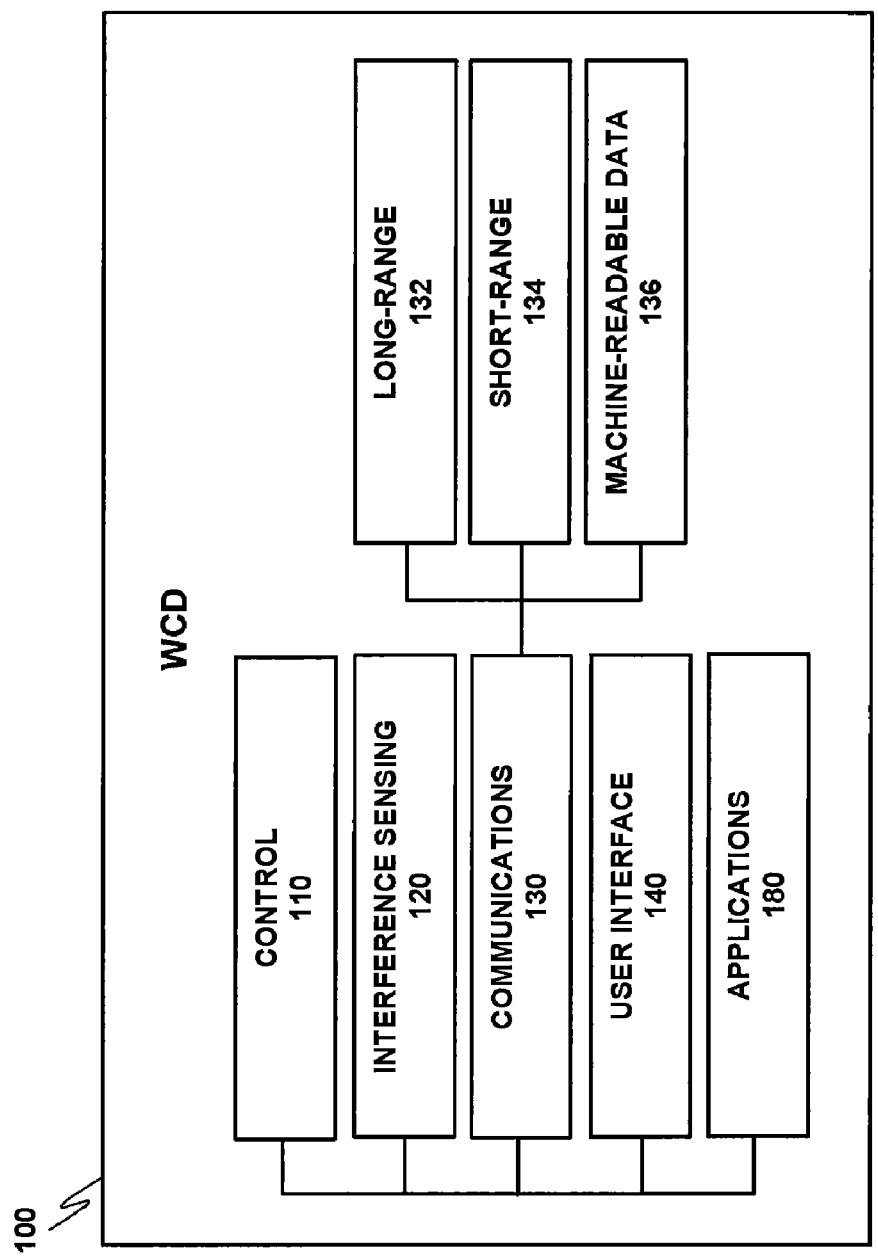
FIG. 1A discloses a modular description of an exemplary wireless communication device usable with at least one embodiment of the present invention.

FIG. 1A discloses an exemplary modular layout for a wireless communication device usable with the present invention. WCD 100 is broken down into modules representing the functional aspects of the device. These functions may be performed by the various combinations of software and/or hardware components discussed below.

Control module 110 regulates the operation of the device. Inputs may be received from various other modules included within WCD 100. For example, interference sensing module 120 may use various techniques known in the art to sense sources of environmental interference within the effective transmission range of the wireless communication device. Control module 110 interprets these data inputs, and in response, may issue control commands to the other modules in WCD 100.

Communications module 130 incorporates all of the communication aspects of WCD 100. As shown in FIG. 1A, communications module 130 may include, for example, long-range communications module 132, short-range communications module 134 and machine-readable data module 136 (e.g., for NFC). Communications module 130 utilizes at least these sub-modules to receive a multitude of different types of communication from both local and long distance sources, and to transmit data to recipient devices within the transmission range of WCD 100. Communications module 130 may be triggered by control module 110, or by control resources local to the module responding to sensed messages, environmental influences and/or other devices in proximity to WCD 100.

User interface module 140 includes visual, audible and tactile elements which allow a user to receive data from, and enter data into, the device. The data entered by a user may be interpreted by control module 110 to affect the behavior of WCD 100. User-inputted data may also be transmitted by communications module 130 to other devices within effective transmission range. Other devices in transmission range may also send information to WCD 100 via communications module 130, and control module 110 may cause this information to be transferred to user interface module 140 for presentment to the user.

Applications module 180 incorporates all other hardware and/or software applications on WCD 100. These applications may include sensors, interfaces, utilities, interpreters, data applications, etc., and may be invoked by control module 110 to read information provided by the various modules and in turn supply information to requesting modules in WCD 100.

Figure 1B:
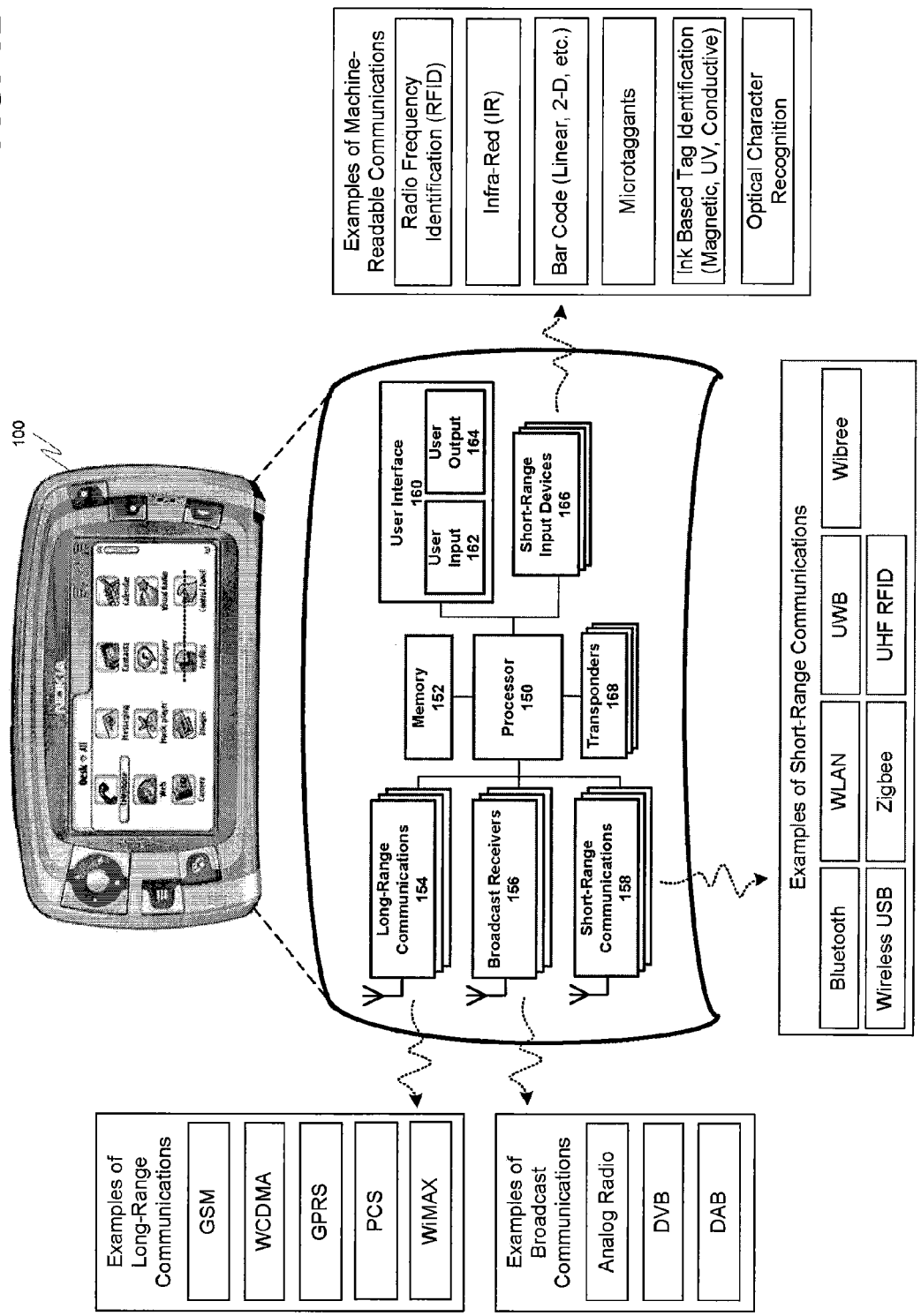
FIG. 1B discloses an exemplary structural description of the wireless communication device previously described in FIG. 1A.

FIG. 1B discloses an exemplary structural layout of WCD 100 according to an embodiment of the present invention that may be used to implement the functionality of the modular system previously described in FIG. 1A. Processor 150 controls overall device operation. As shown in FIG. 1B, processor 150 is coupled to at least communications sections 154, 158 and 166. Processor 150 may be implemented with one or more microprocessors that are each capable of executing software instructions stored in memory 152.

Memory 152 may include random access memory (RAM), read only memory (ROM), and/or flash memory, and stores information in the form of data and software components (also referred to herein as modules). The data stored by memory 152 may be associated with particular software components. In addition, this data may be associated with databases, such as a bookmark database or a business database for scheduling, email, etc.

The software components stored by memory 152 include instructions that can be executed by processor 150. Various types of software components may be stored in memory 152. For instance, memory 152 may store software components that control the operation of communication sections 154, 158 and 166. Memory 152 may also store software components including a firewall, a service guide manager, a bookmark database, user interface manager, and any communication utilities modules required to support WCD 100.

Long-range communications 154 performs functions related to the exchange of information over large geographic areas (such as cellular networks) via an antenna. These long-range network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. In addition to basic voice communication (e.g., via GSM), long-range communications 154 may operate to establish data communication sessions, such as General Packet Radio Service (GPRS) sessions and/or Universal Mobile Telecommunications System (UMTS) sessions. Also, long-range communications 154 may operate to transmit and receive messages, such as short messaging service (SMS) messages and/or multimedia messaging service (MMS) messages.

As a subset of long-range communications 154, or alternatively operating as an independent module separately connected to processor 150, transmission receiver 156 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 158 is responsible for functions involving the exchange of information across short-range wireless networks. As described above and depicted in FIG. 1B, examples of such short-range communications 158 are not limited to Bluetooth™, Wibree™, WLAN, UWB and Wireless USB connections. Accordingly, short-range communications 158 performs functions related to the establishment of short-range connections, as well as processing related to the transmission and reception of information via such connections.

Short-range input device 166, also depicted in FIG. 1B, may provide functionality related to the short-range scanning of machine-readable data (e.g., for NFC). For example, processor 150 may control short-range input device 166 to generate RF signals for activating an RFID transponder, and may in turn control the reception of signals from an RFID transponder. Other short-range scanning methods for reading machine-readable data that may be supported by short-range input device 166 are not limited to IR communication, linear and 2-D (e.g., quick response or QR) bar code readers (including processes related to interpreting universal product codes or UPC labels), and optical character recognition devices for reading magnetic, Ultraviolet (UV), conductive or other types of coded data that may be provided in a tag using suitable ink. In order for short-range input device 166 to scan the aforementioned types of machine-readable data, the input device may include optical detectors, magnetic detectors, CCDs or other sensors known in the art for interpreting machine-readable information.

As further shown in FIG. 1B, user interface 160 is also coupled to processor 150. User interface 160 facilitates the exchange of information with a user. FIG. 1B shows that user interface 160 includes a user input 162 and a user output 164. User input 162 may include one or more components that allow a user to input information. Examples of such components include keypads, touch screens, and microphones. User output 164 allows a user to receive information from the device. Thus, user output portion 164 may include various components, such as a display, light emitting diodes (LED), tactile emitters and one or more audio speakers. Exemplary displays include liquid crystal displays (LCDs), and other video displays.

WCD 100 may also include one or more transponders 168. This is essentially a passive device that may be programmed by processor 150 with information to be delivered in response to a scan from an outside source. For example, an RFID reader mounted in an entryway may continuously emit radio frequency waves. When a person with a device containing transponder 168 walks through the door, the transponder is energized and may respond with information identifying the device, the person, etc. In addition, a reader may be mounted (e.g., as discussed above with regard to examples of short-range input device 166) in WCD 100 so that it can read information from other transponders in the vicinity.

Hardware corresponding to communications sections 154, 156, 158 and 166 provide for the transmission and reception of signals. Accordingly, these portions may include components (e.g., electronics) that perform functions, such as modulation, demodulation, amplification, and filtering. These portions may be locally controlled, or controlled by processor 150 in accordance with software communication components stored in memory 152.

The elements shown in FIG. 1B may be constituted and coupled according to various techniques in order to produce the functionality described in FIG. 1A. One such technique involves coupling separate hardware components corresponding to processor 150, communications sections 154, 156 and 158, memory 152, short-range input device 166, user interface 160, transponder 168, etc. through one or more bus interfaces (which may be wired or wireless bus interfaces).

Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 160 may interact with a communication utilities software component, also contained in memory 152, which provides for the establishment of service sessions using long-range communications 154 and/or short-range communications 158. The communication utilities component may include various routines that allow the reception of services from remote devices according to mediums such as the Wireless Application Medium (WAP), Hypertext Markup Language (HTML) variants like Compact HTML (CHTML), etc.

II. Wireless Communication Mediums

The present invention may be implemented with, but is not limited to, short-range wireless communication mediums. Bluetooth™ is an example of a short-range wireless technology quickly gaining acceptance in the marketplace. A Bluetooth™ enabled WCD may transmit and receives data, for example, at a rate of 720 Kbps within a range of 10 meters, and may transmit up to 100 meters with additional power boosting. Current Bluetooth™ enabled WCD systems may run at a nominal rate of 1 Mbps. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), Wibree™ and UHF RFID. All of these wireless mediums have features and advantages that make them appropriate for various applications.

Wibree™ is an open standard industry initiative extending local connectivity to small devices with technology that increases the growth potential in these market segments. Wibree™ technology may complement close range communication with Bluetooth™-like performance in the 0-10 m range with a data rate of 1 Mbps. Wibree™ is optimized for applications requiring extremely low power consumption, small size and low cost. Wibree™ may be implemented either as stand-alone chip or as Bluetooth™-Wibree™ dual-mode chip. More information can be found on the Wibree™ website: www.wibree.com.

Figure 2:
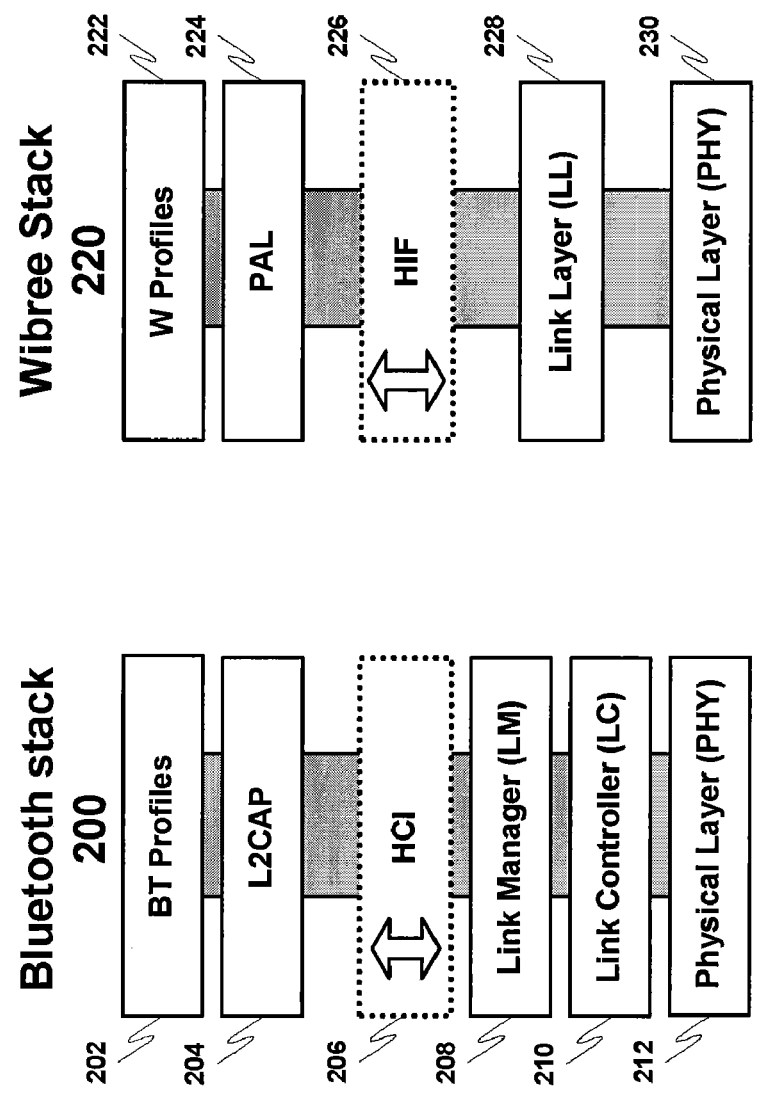
FIG. 2 discloses an exemplary Bluetooth™ protocol stack and an exemplary Wibree™ protocol stack usable with at least one embodiment of the present invention.

Now referring to FIG. 2, an exemplary Bluetooth™ protocol stack and an exemplary Wibree™ protocol stack are disclosed. Bluetooth™ stack 200 includes elements that may convey information from a system level to a physical layer where it may be transmitted wireless to another device. At the top level, BT Profiles 202 include at least a description of a known peripheral device which may be connected wirelessly to WCD 100, or an application that may utilize Bluetooth™ in order to engage in wireless communication with a peripheral device. The use of the phrase "peripheral devices" is not intended to limit the present invention, and is used only to represent any device external to WCD 100 also capable of wirelessly communicating with WCD 100. Bluetooth™ profiles of other devices may be established through a pairing procedure wherein identification and connection information for a peripheral device may be received by WCD 100 through a polling process and then saved in order to expedite the connection to the device at a later time. After the application and/or target peripheral device (or devices) is established, any information to be sent must be prepared for transmission. L2CAP level 204 includes at least a logical link controller and adaptation protocol. This protocol supports higher level protocol multiplexing packet segmentation and reassembly, and the conveying of quality of service information. The information prepared by L2CAP level 204 may then be passed to an application-optional host controller interface (HCI) 206. This layer may provide a command interface to the lower link manager protocol (LMP) layers, link manager (LM) 208 and link controller (LC) 210. LM 208 may establish the link setup, authentication, link configuration and other protocols related to establishing a wireless link between two or more devices. Further, LC 210 may manage active links between two or more devices by handling low-level baseband protocols. Wireless communication may then be established and conducted using the hardware (modem, antenna, etc.) making up physical layer (PHY) 212. Of course, the above identified layers of Bluetooth™ stack 200 may also be utilized in an order reversed from that disclosed above in order to receive a wireless transmission into WCD 100 from a peripheral device.

The layers in the standalone Wibree™ stack 220 are similar to the elements previously described. However, due to the relative simplicity of Wibree™ when compared to Bluetooth™, there are actually less layers utilized to achieve wireless communication. W Profiles 222, similar to the profiles used in Bluetooth™, are used to specify applications that may use Wibree™ for communication and peripheral devices with which a Wibree™ modem may wirelessly communicate. The profile adoption layer (PAL) 224 may be used to prepare the information for transmission via wireless communication. Host interface (HIF) layer 226 may provide an interface between the upper layers communicating with applications and schedulers in WCD 100, and the lower layers of the Wibree™ stack 220 which establish and maintain the links to peripheral devices. Lower layers of the Wibree™ stack 220 may further include at least link layer (LL) 228. LL 228 may both establish and maintain wireless communications with other wireless enabled devices through the use of Physical Layer (PHY) 230. Wibree™ LL 228, however, differs significantly from LM 208 and LC 210 in Bluetooth™.

III. Dual-Mode Modem

Figure 3A:
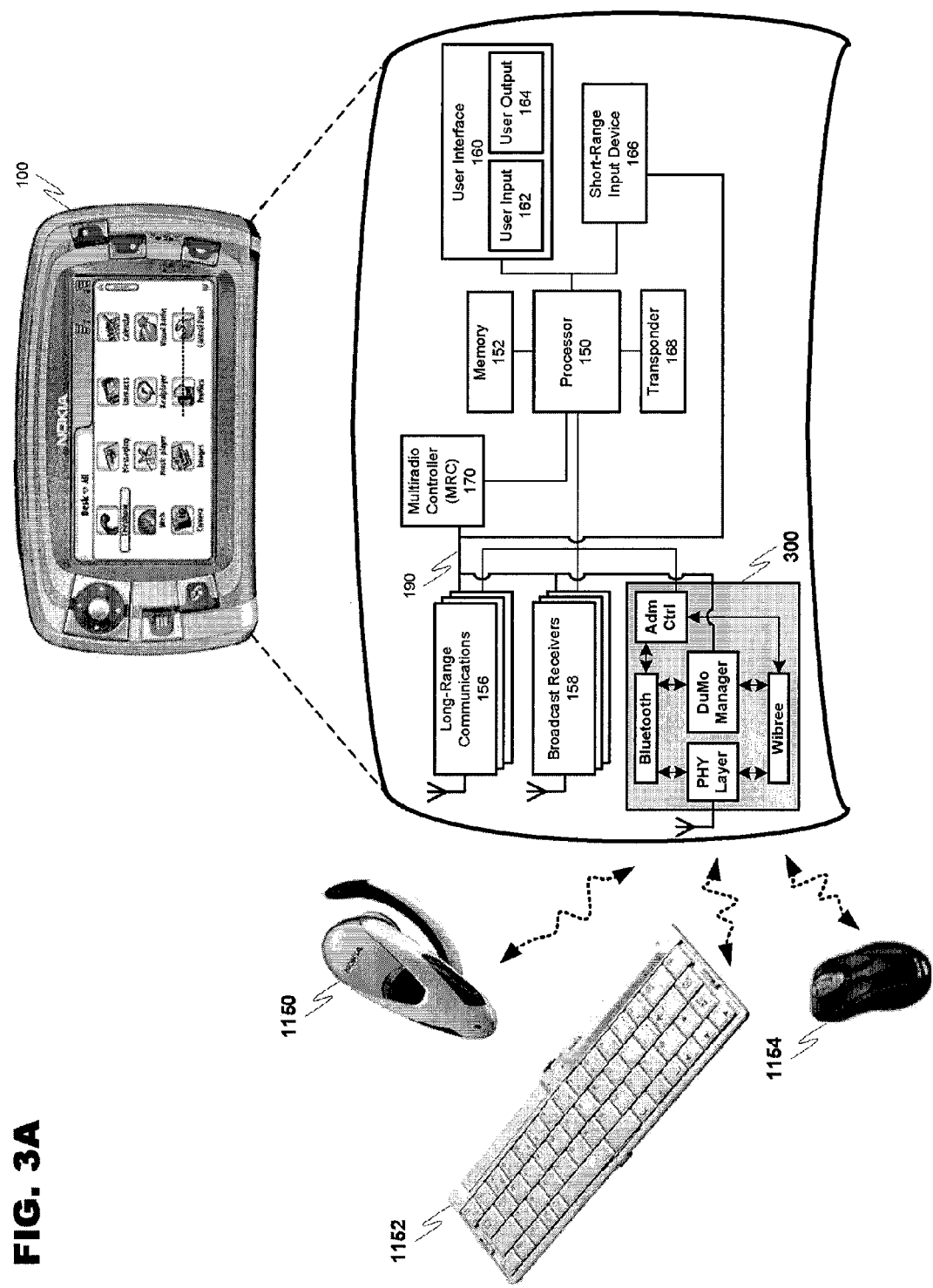
FIG. 3A discloses an example of multiple wireless peripheral devices attempting to communicate concurrently with a dual-mode radio modem in accordance with at least one embodiment of the present invention.

FIG. 3A includes an alternative exemplary implementation of at least one embodiment of the present invention. Again, in this example the three peripheral devices (1150, 1152 and 1154) are attempting concurrent communication with WCD 100 through dual-mode radio modem 300. Radio modem 300 may include local control resources for managing both "radios" (e.g., Bluetooth™ and Wibree™ software based radio control stacks) attempting to use the physical layer (PHY) resources of dual-mode radio modem 300. In this example, dual-mode radio modem 300 includes at least two radio stacks or radio protocols (labeled "Bluetooth" and "Wibree") that may share the PHY layer resources (e.g., hardware resources, antenna, etc.) of dual-mode radio modem 300. The local control resources may include an admission controller ("Adm Ctrl") and a dual-mode controller ("DuMo Manager"). These local control resources may be embodied as a software program and/or in a hardware form (e.g., logic device, gate array, MCM, ASIC, etc.) in a dual-mode radio modem interface, and the radio modem interface may be coupled to, or alternatively, embedded in dual-mode radio modem 300. The interaction of these control resources with the radio protocols utilizing dual-mode radio modem 300 is explained below.

Figure 3B:
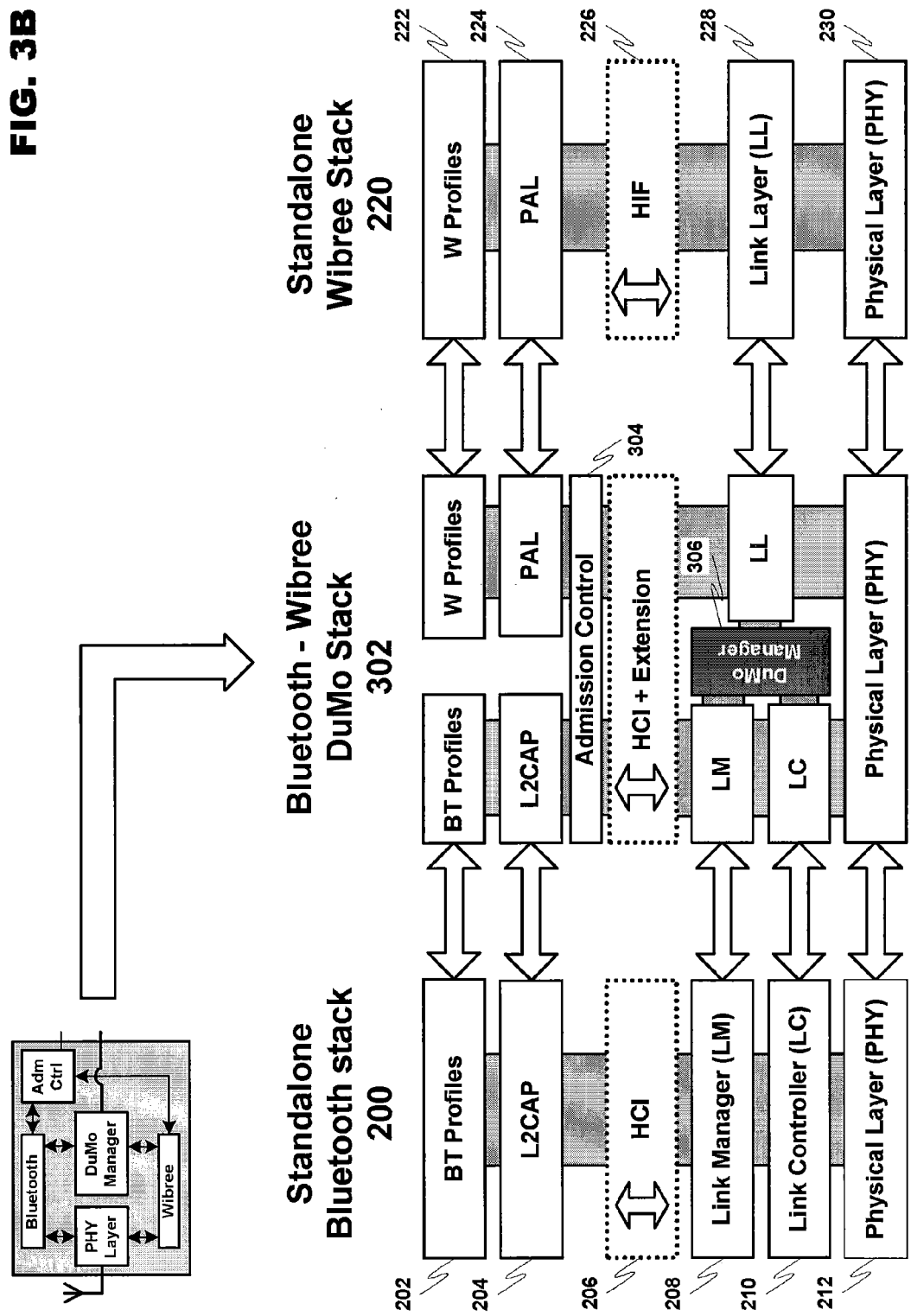
FIG. 3B discloses further detail pertaining to the example of FIG. 3A regarding operational enhancements for managing the operation of a dual-mode modem in accordance with at least one embodiment of the present invention.

With respect to FIG. 3B, an exemplary combination of the two separate radio protocol stacks (previously discussed with respect to FIG. 2) into a single combined entity controlled locally by at least an admission control 304 and a DuMo manager 306 is now disclosed. The two previously described standalone stacks are shown to establish the individual elements that may be incorporated into an integrated dual-mode entity 302. For a more specific discussion of the functioning of admission control 304 and a DuMo manager 306 in terms of managing the operations of dual-mode modem 300, please refer to application Ser. No. 11/538,310, filed Oct. 3, 2006, which is hereby incorporated by reference. Briefly, Admission control 304 may act as a gateway for the dual-mode radio modem 300 by filtering out both Bluetooth™ and Wibree™ requests from the operating system of WCD 100 that may result in conflicts. Scheduling information may also be provided by Multiradio controller (MRC) 170, wherein certain periods of operation are allocated to dual-mode radio modem 300 in view of the other active radio modems operating in WCD 100. This scheduling information may be passed down to both the HCI+Extension level of the combined protocol stacks and also to DuMo manager 306 for further processing. However, if scheduling information from MRC 170 is critical (delay-sensitive), it may be sent through MCS 190 via a direct connection to DuMo Manager 306. The information received by DuMo manager may 306 then be used to create an interleaved schedule for dual-mode radio modem 300 allowing both the Bluetooth™ and Wibree™ protocols to operate concurrently.

IV. Protocol Stacks and Packet Routing

Figure 4:
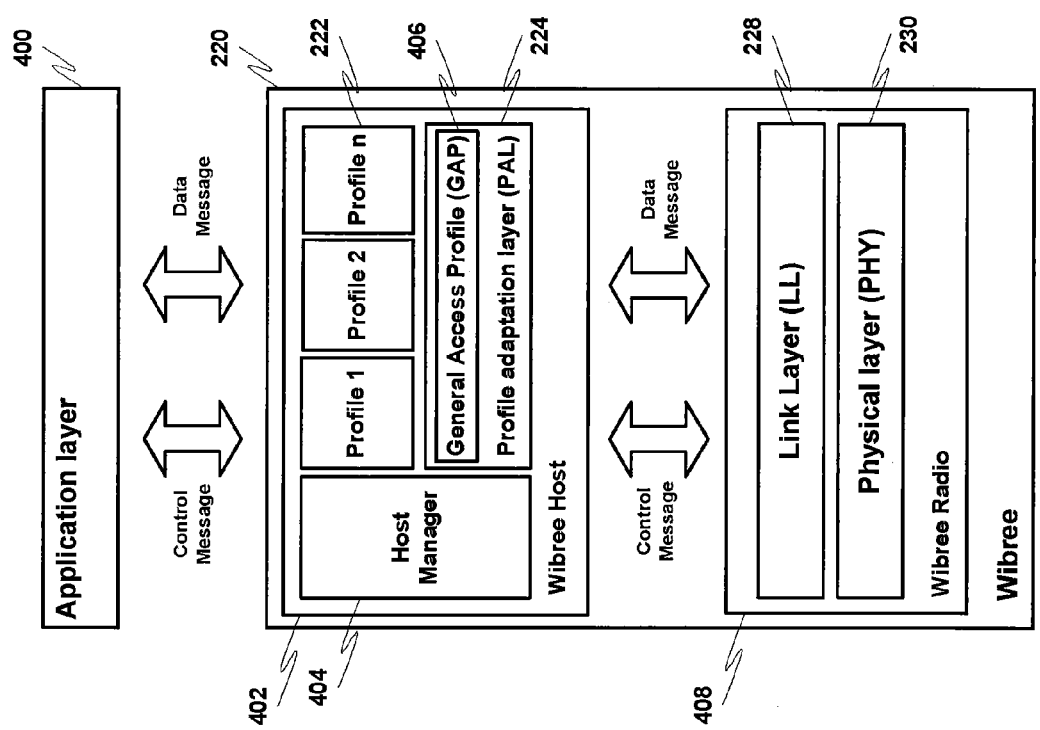
FIG. 4 discloses a more detailed example of a Wibree™ protocol stack in accordance with at least one embodiment of the present invention.

FIG. 4 includes a more detailed description of the upper layers of the Wibree™ communication protocol. The Wibree™ system includes two parts: the Wibree™ Radio 408 and the Wibree™ Host 402. Connection between radio 408 and host 402 goes through the HIF (Host Interface). Further, PAL 224 includes at least General Access Profile (GAP) 406.

Application layer 400 may include various programs that may be executed on a computing device. For example, an application may be a communication utility or productivity program running on a WCD. An application may use W Profiles 222 in Wibree™ (e.g. Profile 1, Profile 2, etc.) in order to send information into the Wibree™ protocol stack 220. This transaction may be supervised by Host Manager 404. The information may then be prepared by PAL 224 and GAP 406 for routing to Wibree™ radio 408, wherein LL 228 may both establish new wireless connections and manage existing connections with peripheral devices through the various resources (modem, antenna, etc.) that make up PHY layer 230.

V. Communication Between an Advertiser and at Least One Receiving Device with Connection Referring now to FIG. 5A, an example of communication between two wireless devices including the establishment of a formal network connection is disclosed. Device A 500 (hereafter referred to as receiving device 500) may initiate wireless communication with Device B (hereafter referred to as advertiser 502) after receiving a broadcast signal from advertiser 502. The initiation of wireless communication by receiving device 500 and subsequent interaction between these devices may be automatic or manual (e.g., including at least some intervention from user 110). Further, these devices may be previously known to each other, for example they may be two devices owned by the same user 110, or alternatively, they may be foreign to each other, such as in the case of a user 110 with WCD 100 strolling into transmission range of advertiser 502 at a shopping mall.

As set forth above, advertiser 502 may broadcast a signal to all devices within effective transmission range. This signal may be repeated periodically, may be trigger by another device (e.g., a motion sensor) alerting advertiser 502 to the presence of a potential receiving device 500, etc. Information included in the broadcast signal, Id_info, may include, among other things, an identification for advertiser 502. This identification may be public (e.g., can be read by any receiving device) or may be private (e.g., only certain receiving devices 500 can decode the address field to identify advertiser 502). The Id_info message may be broadcast, according to at least one embodiment of the present invention, on an advertising channel. All potential receiving devices 500 may be aware that any broadcast messages should be expected on the designated advertising channel (also, in some instance, called the initialization channel). In a more specific scenario, the Wibree™ wireless medium includes three advertising channels. Therefore, receiving device 500 and advertiser 502, when communicating using Wibree™, may be enabled to utilize one or more of the three advertising channels in a strategy to enhance broadcast coverage in view of advertising channel availability.

Receiving device 500, upon receiving the Id_info message from advertiser 502, may either ignore the message or initiate communications with advertiser 502. Receiving device 500 may respond, for example, if advertiser 502 is recognized as having information of interest to user 110. This recognition may occur automatically, or user 110 may be alerted to the presence of receiving device 500, whereby user 110 reacts by prompting receiving device 500 (e.g., WCD 100) to respond to the broadcast. Alternatively, receiving device 500 may respond simply by acknowledging the reception of any information from any advertiser device. Receiving device 500 may then transmit an Id_info_rsp [connect] message requesting a formal network connection with advertiser 502. If advertiser 502 is in a condition to honor the request (e.g., advertiser 502 is, for example, not already connected to another device and has adequate power) a formal network connection may be established between the two devices 500 and 502.

The formal network connection, as shown in FIG. 5A ("DEVICES CONNECTED ON DATA CHANNEL"), will not be established on the advertising channel. Instead, a different channel specifically for the subsequent exchange of data may be selected by one or both of the devices. This connection will allow the devices to exchange information without occupying the advertising channel. The exchange of data (e.g., Data_PDU) may continue until receiving device 500 receives all data requested from advertiser 502, or alternatively, until one of the devices is forced to break communication (e.g., out of range, power limitation, interference, etc.)

The problem with the communication disclosed in FIG. 5A is the added step of establishing a formal network between the two devices. This step increases the complexity of the wireless transaction, and as a result, introduces increased time per device requirements and added potential for technical problems. In addition, as the technology exists today, advertiser 502 may not be able to service other receiving devices 500 while engaged in a formal network connection with one receiving device 500 on a data channel. This condition would necessarily restrict the transmission of information to other wireless devices 500 until the current formal network connection is terminated. In a situation where receiving device 500 may only briefly be in range of advertiser 502, short execution time and simplicity are essential to bolster successful transactions. The present invention, in at least one embodiment, seeks to remedy these problems.

VI. Communication Between an Advertiser and at Least One Receiving Device without Connection FIG. 5B discloses connectionless communications between advertiser 502 and receiving device 500 in accordance with at least one embodiment of the present invention. Similar to FIG. 5A, advertiser 502 may broadcast an Id_info message containing at least identification information for the device on the advertising channel. The broadcast message may again be received by receiving device 500. However, in this example the receiving device may respond with a message inquiring as to the immediate availability of information without having to negotiate a formal network connection with advertiser 502. The Id_info_rsp [scan] message may be used to request information related to a mapping of the services/features/abilities of advertising device 502. If this feature is available in advertiser 502, the device may respond to this request by transmitting an Id_features_map, in one or more packets, to receiving device 500. The Id_features_map may further indicate to receiving device 500 information that is available both through connectionless transfer and with the requirement of a formal network connection. A formal network connection may be required in certain scenarios, such as in the transfer of sensitive or confidential information. As an example, if advertising device 502 includes a system of wireless sensors, Id_features_map may indicate all of the sensor information available for transfer without a formal network connection between receiving device 500 and advertiser 502.

While the exemplary scenario of a request for Id_features map data is disclosed above, the present invention is not specifically limited to only this type of information request. Other information may also be requested from advertiser 502 in accordance with at least embodiment of the present invention. For example, as disclosed in FIG. 5C, receiving device 500 may inquire about other information through an Id_info_resp [connectionless data request] message. This request may be initiated regardless of whether receiving device 500 is aware of the actual availability of the information. If the information is available, advertiser 502 may provide it in a response message. Alternatively, advertiser 502 may respond by informing receiving device 500 that the requested information is not available for transmission, or may not respond at all, which receiving device 500 may interpret as the information not being available.

Figure 5D:
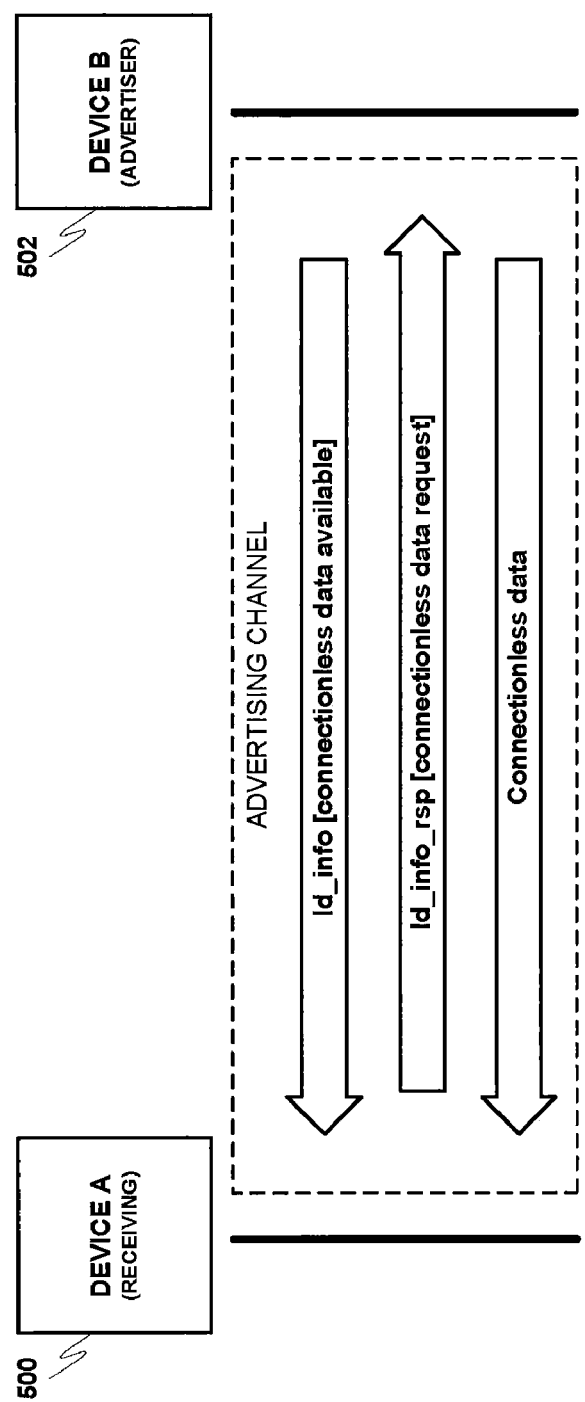
FIG. 5D discloses another example of communications between an advertiser and a receiving device including additional information transmitted without the need for a formal network connection in accordance with at least one embodiment of the present invention.

FIG. 5D discloses an alternate communication scheme for delivering information between the two wireless devices without having to negotiate a formal network connection. In this example of the present invention, advertiser 502 may include additional information in the broadcast message informing receiving device 500 of information that is available for download without the need to establish a formal network connection. The enhanced broadcast is disclosed as the Id_info message further containing [connectionless data available] information in FIG. 5D. As a result, receiving device 500 may then immediately respond to advertiser 502 in the form of a Id_info_resp [connectionless data request] message requesting the connectionless data be transmitted without the need to form a formal network connection. If the information received in the connectionless data message fulfils the requirements of receiving device 500, then the full transaction may be complete. In this way, the duration of communication between advertiser 502 and receiving device 500 may be further compressed, reducing the overall transaction time and allowing more receiving devices 500 to obtain wireless information from advertiser 502.

VII. Example Message Packets

FIG. 6A-6D disclose examples of message packets for performing the previously set forth communication transactions in accordance with at least one embodiment of the present invention. FIG. 6A discloses an exemplary Id_info packet. The structure of the packet is shown at 600. The structure of the device service field (8 bits) is discussed in further detail at 602. Characteristics of advertiser 502 that may be defined by bits in the device service field includes whether the advertiser may also act as a polled device if requested by a receiving device 500 in the Id_info_rsp message, whether the address fields in advertiser 502 are public or private, whether secure links are supported by advertiser 502, whether advertiser 502 will only accept responses from certain receiving devices 500, whether a connection is currently possible to a receiving device and whether connectionless data is available if requested in and Id_info_rsp. A receiving device may receive a broadcast Id_info packet, interpret the information and based on the setting of these bits in the device service field may understand the current state of advertiser 502 and what information is available by request in view of the current state of the device.

There are some circumstances where a secure connection may be required, and this security may only be provided through a formal network connection. For example, a surveillance system may be able to provide setting information regarding camera and other sensor devices to receiving device 502. However, this information should not be able to be intercepted by any listening WCD 100, so a formal network may be required in order to securely convey this information. However, in some circumstances advertiser 502 may not be prevented from broadcasting an Id_info message during this connection. This may be possible if the devices can operate in a sniff mode (power saving through pre-arranged periodic operation), and as a result, periods of free time exist allowing advertiser 502 to communicate with other devices. As previously discussed, a bit may be configured in the Id_info message, for example the connection possible bit, in order to communicate to other devices that while advertiser 502 is currently connected to receiving device 500 (which would prevent a formal network connection with another receiving device 500), some information may still be possible for distribution via connectionless transmission. The availability of connectionless data may be further indicated by the condition of the connectionless data available bit in the device service field of Id_info 600.

Figure 7:
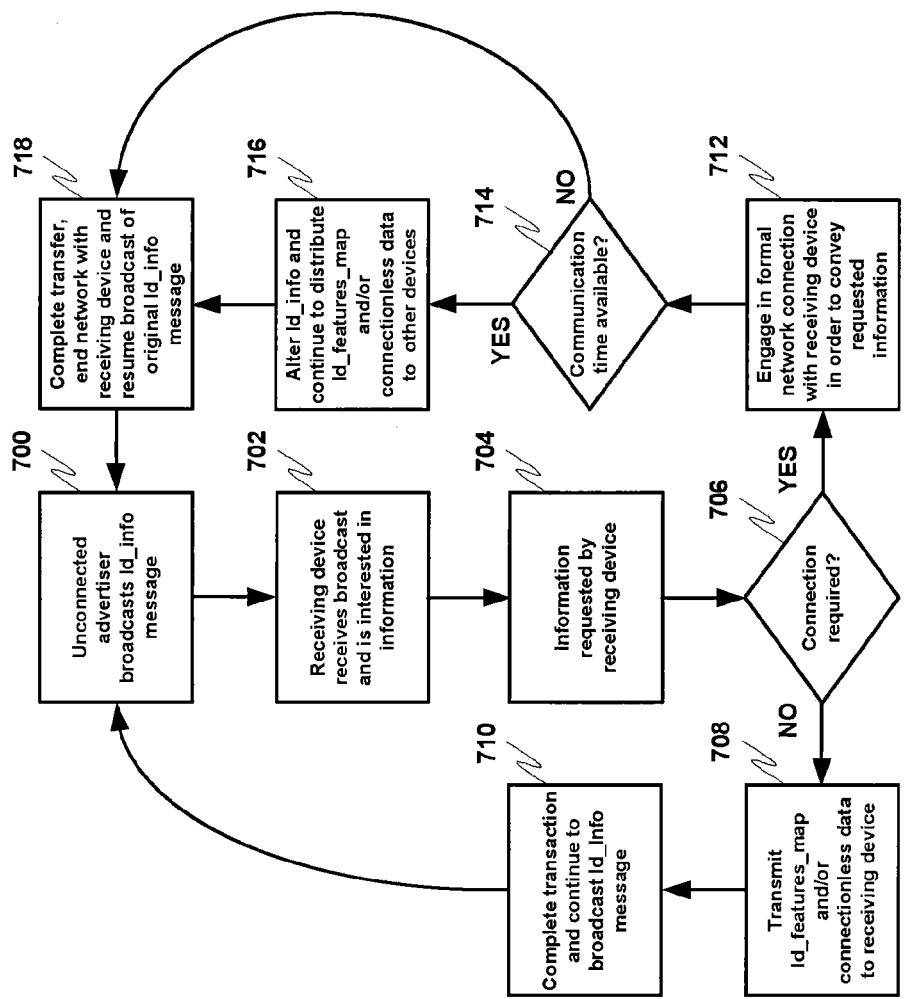
FIG. 7 discloses a flowchart of an exemplary process for an advertiser to transmit broadcast information even when in engaged in a formal network connection with a receiving device in accordance with at least one embodiment of the present invention.

Jumping ahead for a moment, FIG. 7 discloses an exemplary process flow for an advertiser 502 enabled to communicate concurrently with more than one receiving device 500 in accordance with at least one embodiment of the present invention. In step 700 an unconnected advertiser 502 begins the advertising process by broadcasting an Id_info message. A receiving device 500 interested in information that may be provided by advertiser 502 (step 702) may further request information from advertiser 502 at 704. If the information is determined to be connectionless data (e.g., data such as Id_features_map that may be provided without a formal network connection) in step 706, then the information is provided in step 708. If no other information is requested from advertiser 502, the current information transfer process may be completed in step 710, which may return advertiser 502 to the initial broadcast mode in step 700.

However, if a connection is required, for example to ensure a secure transaction for sensitive or confidential information, then in step 712 a formal network connection is negotiated and information may be transferred between receiving device 500 and advertiser 502. However, depending on the nature of this connection (e.g., if the devices support sniff mode), Advertiser 502 may also continue to broadcast Id_info messages. A determination as to whether time is available for advertiser 502 to continue to send broadcast messages is made in step 714. If time is available per the step 714 determination, then an altered or modified Id_info message offering to distribute information such as the Id_features_map and some or all of the available connectionless data may be broadcast by advertiser 502 in step 716. Other receiving devices 500 receiving this broadcast information may further request the connectionless data to be sent. Eventually, regardless of whether communication time was available in step 714, the transaction between the original receiving device 500 and advertiser 502 may be completed, and the formal network connection may be severed in step 718. Advertiser 502, now unconnected from any other device, may resume broadcasting the original Id_info message in step 700.

Returning now to the description of various message packets usable with at least one embodiment of the present invention, FIG. 6B discloses an example of an Id_info_rsp message 604. This message 604 may include a payload as described at 606. Elements in the payload may include a do role switch (DRS) indicator for requesting that advertiser 502 switch roles (polling vs. polled) with receiving device 500. ScanOrConnectOrConnectionlessDataReq is a data field that indicate at least three different requested actions. Initially, it may request that a feature map (scan) be transmitted to receiving device 500. This information may be used by receiving device 500 to determine the services/features/abilities of advertising device 502. Further, a formal network connection may be requested with advertising device 502. This may be requested, for example, due to a need to maintain a high security level for transmitted information. Finally, receiving device 500 may request connectionless data from advertiser 502. As previously described above, the connectionless data request may be made based on information that was originally advertised in the Id_info message, or may be made simply because receiving device 500 desires to obtain the information Other fields may specify, as further disclosed in FIG. 6B, whether the address field contains public or private addresses, the frequency channel for data transfer (in the situation where a formal network connection is required) and the public or private addresses previously referred to by the PrivateAddress field.

FIG. 6C includes an alternative form of the Id_info_rsp packet originally disclosed in FIG. 6B. This version may be more specifically tailored for responding the Id_info message scenario disclosed in FIG. 5C. In this version 608, the payload may be 56 bits in length, the contents of which are further disclosed at 610. Here, a two bit ScanOrConnect flag is used to either signify a request to advertiser 502 for more information or to negotiate a formal network connection. A third option for requesting connectionless data has been moved to a separate field to accommodate advertisers 502 that advertise more than one connectionless data element that is available. The requested information field (8 bits) allows receiving device 500 to request one or more specific elements of data from the full array of connectionless data that is available.

The Id_features_map is described further in FIG. 6D. This message 612 is similar to the Id_info message in structure, and may be used to provide information about the services/features/abilities of advertiser 502. The payload of this message if described in more detail at 614. For example, this message may include a bitmap of support profiles in the SupportedProfiles field (16 bits). Other information may be related to the security features and/or requirements of advertiser 502 and advertiser 502 identification information.

The exemplary message packets disclosed in FIGS. 6A-6D and the communication process disclosed in FIG. 7 may at least help to resolve the aforementioned time and complexity problems seen in distributing information through formal network connections. Advertisers 502 enabled to engage in connectionless data exchanges may be capable of servicing the information needs of similarly enabled receiving devices 500 by providing connectionless data in situations, for example, where advertiser 502 is already engaged in a formal network connection with a receiving device 500. Conversely, advertising device 502 may also be capable of engaging in a formal network connection with a receiving device 500, when needed, while already providing connectionless data to other devices. As a result, advertising device 502 may continue to provide an indication of its presence and at least some services to more than one device simultaneously.

The present invention provides at least one benefit over existing wireless communication systems in that a formal network connection may not be necessary in order to obtain wireless information from an advertising device. Instead, information requiring no formal network connection may be offered and requested through modified wireless messages that facilitate quick and simple communication. In this way, all devices, but especially low power and low complexity wireless devices, may be enabled to communicate more expediently, and as a result, a larger number of consuming devices may be serviced by an advertising device.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. A method, comprising:
   receiving a message at a device, the message being received on a predetermined advertising channel indicating at least presence and identity of a proximate device;
   transmitting a message requesting connectionless data transmission from the proximate device in response to the received advertising message, the request message being transmitted on the advertising channel without establishing a formal network by negotiating at least one subsequent channel between the device and the proximate device dedicated to the communication of data; and
   receiving the connectionless data transmission from the proximate device via short-range wireless communication on the advertising channel in response to the request message.

2. The method of claim 1, wherein the received advertising message further includes an indication that specific information is available for transmission on the advertising channel.

3. The method of claim 2, wherein the indication is at least one of a feature map or other specific information is available for transmission on the advertising channel.

4. A computer program product comprising computer executable program code recorded on a non-transitory computer readable storage medium, the computer executable program code comprising:
   code for receiving a message at a device, the message being received on a predetermined advertising channel indicating at least the presence and identity of a proximate device;
   code for transmitting a message requesting connectionless data transmission from the proximate device in response to the received advertising message, the request message being transmitted on the advertising channel without establishing a formal network by negotiating at least one subsequent channel between the device and the proximate device dedicated to the communication of data; and
   code for receiving the connectionless data transmission from the proximate device via short-range wireless communication on the advertising channel in response to the request message.

5. The computer program product of claim 4, wherein the received advertising message further includes an indication that specific information is available for transmission on the advertising channel.

6. The computer program product of claim 5, wherein the indication is at least one of a feature map or other specific information is available for transmission on the advertising channel.

7. A device, comprising:
   at least one processor; and
   at least one memory including executable instructions, the at least one memory and the executable instructions being configured to, in cooperation with the at least one processor, cause the apparatus to perform at least the following:
   receive a message, the message being received on a predetermined advertising channel indicating at least the presence and identity of a proximate device;
   transmit a message requesting connectionless data transmission from the proximate device in response to the received advertising message, the request message being sent on the advertising channel without establishing a formal network by negotiating at least one subsequent channel between the device and the proximate device dedicated to the communication of data; and
   receive the connectionless data transmission from the proximate device via short-range wireless communication on the advertising channel in response to the request message.

8. A system comprising:
   an advertising device; and
   at least one receiving device;
   the at least one receiving device receiving a message, the message being received on a predetermined advertising channel indicating at least the presence and identity of a proximate device;
   the at least one receiving device further transmitting a message requesting connectionless data transmission from the proximate device in response to the received message, the request message being sent on the advertising channel without establishing a formal network by negotiating at least one subsequent channel between the device and the proximate device dedicated to the communication of data; and
   the at least one receiving device further receiving the connectionless data transmission from the proximate device via short-range wireless communication on the advertising channel in response to the request message.

9. A method, comprising:
   broadcasting an advertising message from a device via short-range wireless communication on a predetermined advertising channel;
   receiving, in response to the advertising message, a message requesting connectionless data transmission on the advertising channel without having to establish a formal network by negotiating at least one subsequent channel between the device and a requesting device dedicated to the communication of data; and
   responding to the received message by performing the requested connectionless data transmission via short-range wireless communication on the advertising channel.

10. The method of claim 9, wherein the advertising message indicates that specific information is available for transmission on the advertising channel.

11. The method of claim 9, wherein responding to the received message comprises not responding to the request when the requested information is not available.

12. A computer program product comprising computer executable program code recorded on a non-transitory computer readable storage medium, the computer executable program code comprising:
   code for broadcasting an advertising message from a device via short-range wireless communication on a predetermined advertising channel;
   code for receiving, in response to the advertising message, a message requesting connectionless data transmission on the advertising channel without having to establish a formal network connection by negotiating at least one subsequent channel between the device and a requesting device dedicated to the communication of data; and
   code for responding to the received message by performing the requested connectionless data transmission via short-range wireless communication on the advertising channel.

13. The computer program product of claim 12, wherein the advertising message indicates that specific information is available for transmission on the advertising channel.

14. The computer program product of claim 12, wherein responding to the received message comprises not responding to the request when the requested information is not available.

15. A device, comprising:
   at least one processor; and
   at least one memory including executable instructions, the at least one memory and the executable instructions being configured to, in cooperation with the at least one processor, cause the device to perform at least the following:

broadcast an advertising message via short-range wireless communication on a predetermined advertising channel;

receive, in response to the message, a message requesting connectionless data transmission on the advertising channel without having to establish a formal network by negotiating at least one subsequent channel between the device and a requesting device dedicated to the communication of data; and respond to the received message by performing the requested connectionless data transmission via short-range wireless communication on the advertising channel.

* * * * *